(12) United States Patent
Tateishi

(10) Patent No.: US 6,873,486 B2
(45) Date of Patent: Mar. 29, 2005

(54) APPARATUS FOR MEASURING LATERAL SHIFT OF RUNNING MAGNETIC TAPE

(75) Inventor: Seiji Tateishi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 106 days.

(21) Appl. No.: 10/459,568

(22) Filed: Jun. 12, 2003

(65) Prior Publication Data

US 2003/0231421 A1 Dec. 18, 2003

(30) Foreign Application Priority Data

Jun. 12, 2002 (JP) ......................... 2002-171308
May 27, 2003 (JP) ......................... 2003-148658

(51) Int. Cl.$^7$ ........................ G11B 17/00; G11B 27/36
(52) U.S. Cl. ........................ 360/71; 360/31; 360/53
(58) Field of Search ................ 360/77.12, 53, 360/31, 71, 72.2, 130.2, 130.21, 130.31, 74.3; 226/15, 16, 17, 18; 242/615.12, 324.1

(56) References Cited

U.S. PATENT DOCUMENTS 3,678,220 A * 7/1972 Luhrs ..................... 360/71
4,305,536 A * 12/1981 Burdorf et al. ......... 242/615.12
4,913,325 A * 4/1990 Cacicedo ................. 226/21
2003/0107836 A1 * 6/2003 Zweighaft et al. ....... 360/77.12

FOREIGN PATENT DOCUMENTS

JP      2000-339792 A      12/2000

* cited by examiner

Primary Examiner—Andrew L. Sniezek
(74) Attorney, Agent, or Firm—Sughrue Mion, PLLC

(57) ABSTRACT

To measure a lateral shift of running magnetic tape caused by a lateral movement of the magnetic tape which occurs while the magnetic tape is running, a fixed write head H1 of a measurement apparatus 10 magnetizes part of the running magnetic tape MT in a section of the apparatus 10 where the magnetic tape MT is free from restriction on lateral movement; a pair of guides 14, 14 in a tape guide unit of the apparatus 10 is located downstream of the fixed write head H1 to restrict the lateral movement of the magnetic tape MT; and a fixed read head H2 reads information recorded on the magnetic tape MT in the tape guide unit.

19 Claims, 5 Drawing Sheets

APPARATUS FOR MEASURING LATERAL SHIFT OF RUNNING MAGNETIC TAPE

BACKGROUND OF THE INVENTION

This invention relates to an apparatus for measuring a lateral shift of running magnetic tape caused by lateral movement of the magnetic tape which occurs while the magnetic tape is running.

The magnetic tape that has commonly be used as data storage for a computer in recent years has an increasing recording density to enlarge a storage capacity thereof. Therefore, data tracks on which data are written and recorded are designed to be very narrow; for example, some magnetic tape has a track width of approximately 10–20 $\mu$m. In such narrow-track magnetic tape, lateral movement (side-to-side movement) of the magnetic tape which is likely to occur while the magnetic tape is running would affect the reliability of a magnetic tape drive that reads/writes data from/onto the magnetic tape, and thus should preferably be minimized. Accordingly, the lateral movement of magnetic tape as described above need be measured on several occasions in the course of development of a magnetic tape cartridge or a magnetic tape drive.

When lateral movement of magnetic tape is measured, hitherto known techniques, as disclosed in JP 2000-339792 A, used to measure a position of a side edge of the magnetic tape which is running in the drive, utilizing a photo interrupter or the like.

However, the change in position of the side edge of the magnetic tape results from a combination of lateral movement of the magnetic tape due to uneven distribution of stress or the like and variation of the width of the magnetic tape due to widthwise dimensional errors. To be more specific, the width of the magnetic tape is not completely maintained uniform along the length, and the position of the side edge of the magnetic tape changes due to errors in shape or size as described above, as well as an actual shift in position. Consequently, the methods for measuring lateral movement according to the aforementioned conventional techniques cannot measure the true movement only due to a lateral shift in position of the running magnetic tape.

The present invention has been proposed to eliminate the above-described disadvantages in the conventional techniques; therefore, it is an exemplified object of the present invention to provide an apparatus for measuring a lateral shift of running magnetic tape caused by lateral movement of the magnetic tape which occurs while the magnetic tape is running.

SUMMARY OF THE INVENTION

According to one exemplified aspect of the present invention, there is provided an apparatus for measuring a lateral shift of running magnetic tape (hereinafter referred to as "measurement apparatus"), which includes a fixed magnetic write head that magnetizes part of the running magnetic tape in a first section (of the apparatus) where the magnetic tape is free from restriction on lateral movement, a tape guide unit that is located in a second section (of the apparatus) downstream of the fixed magnetic write head to restrict the lateral movement of the magnetic tape, and a fixed magnetic read head that reads information on the magnetic tape in the tape guide unit.

With this measurement apparatus, part of magnetic tape is magnetized by the magnetic write head in the first section of the apparatus where lateral movement of the magnetic tape is not restricted. At this stage, if the magnetic head is designed to be brought into contact with the magnetic tape, the magnetic tape is likely to shift in position. Thus, in order to prevent the magnetic tape from shifting in position, it is preferable that the magnetic tape is magnetized in a contactless manner. If the magnetic head fixed in the section where lateral movement of the magnetic tape is not restricted as described above is used for magnetizing the magnetic tape, information is written on the magnetic tape which is allowed to move laterally due to uneven distribution of stress or the like. In other words, the information is written along a meander line as seen from a side edge of the magnetic tape in accordance with the lateral shift of the magnetic tape.

Throughout the specification, the term "restrict" or "restriction" is intended to mean severely restricting lateral movement of the magnetic tape, and indicates that the shift amount of the running magnetic tape is less than 1 $\mu$m. On the other hand, the term "free from restriction" or "not restrict" is intended to mean that the lateral movement of the magnetic tape is not severely restricted; thus, in cases where the magnetic tape is restricted but movable to the extent that the lateral movement can be beyond the "severe restriction" range, the magnetic tape is deemed to be within the range of "free from restriction".

Thereafter, the magnetic tape that has been magnetized goes to a section downstream of the fixed magnetic write head, and the information recorded on the magnetic tape is read out by the magnetic read head while the magnetic tape is being restricted from moving laterally by the tape guide unit. In other words, reading information written on the magnetic tape by the write magnetic head enables adequate measurement, for example, of an extent to which the information is shifted laterally in position, using a change in the outputted information. Since the shift of the information written on the magnetic tape is derived from the movement of the magnetic tape, the lateral shift of the magnetic tape caused by the lateral movement of the magnetic tape which occurs while the magnetic tape is running can resultantly be measured.

An apparatus for measuring a lateral shift of running magnetic tape according to another exemplified aspect of the present invention includes a tape guide unit that restricts lateral movement of the running magnetic tape, a fixed magnetic write head that magnetizes part of the magnetic tape in the tape guide unit, and a fixed magnetic read head that reads the information on the magnetic tape, the fixed magnetic read head being located in a section downstream of the tape guide unit, where the magnetic tape is free from restriction on lateral movement.

With this measurement apparatus, the magnetic tape is magnetized by the magnetic write head with lateral movement of the magnetic tape being restricted in the tape guide unit, and information is written on the magnetic tape. In other words, the information is written on the magnetic tape along a straight line at a predetermined distance from the side edge of the magnetic tape.

Thereafter, the information recorded on the magnetic tape is read by the magnetic read head located in a section downstream of the tape guide unit, where the is magnetic tape is not restricted from moving laterally. At this stage, it is preferable, if possible, that the information is read in a contactless manner so as to eliminate a detrimental effect of contact between the magnetic read head and the magnetic tape.

In the section where the magnetic tape is not restricted from moving laterally, the magnetic tape is allowed to meander in accordance with distribution of stress or the like of the magnetic tape, and thus the magnetized pattern or information runs along a meander line. Accordingly, if the magnetic read head fixed in such a nonrestrictive section as above is used to read information, lateral movement of information on the magnetic tape can be measured using a change in the outputted information, or the like.

Consequently, a lateral shift of the magnetic tape caused by the lateral movement of the magnetic tape which occurs while the magnetic tape is running can be measured.

Other objects and further features of the present invention will become readily apparent from the following description of preferred embodiments with reference to accompanying drawings.

DETAILED DESCRIPTION OF THE PREFERRED EMBODIMENTS

Exemplified embodiments of the present invention will hereinafter be described with reference to the drawings.
[First Embodiment]

Figure 1:
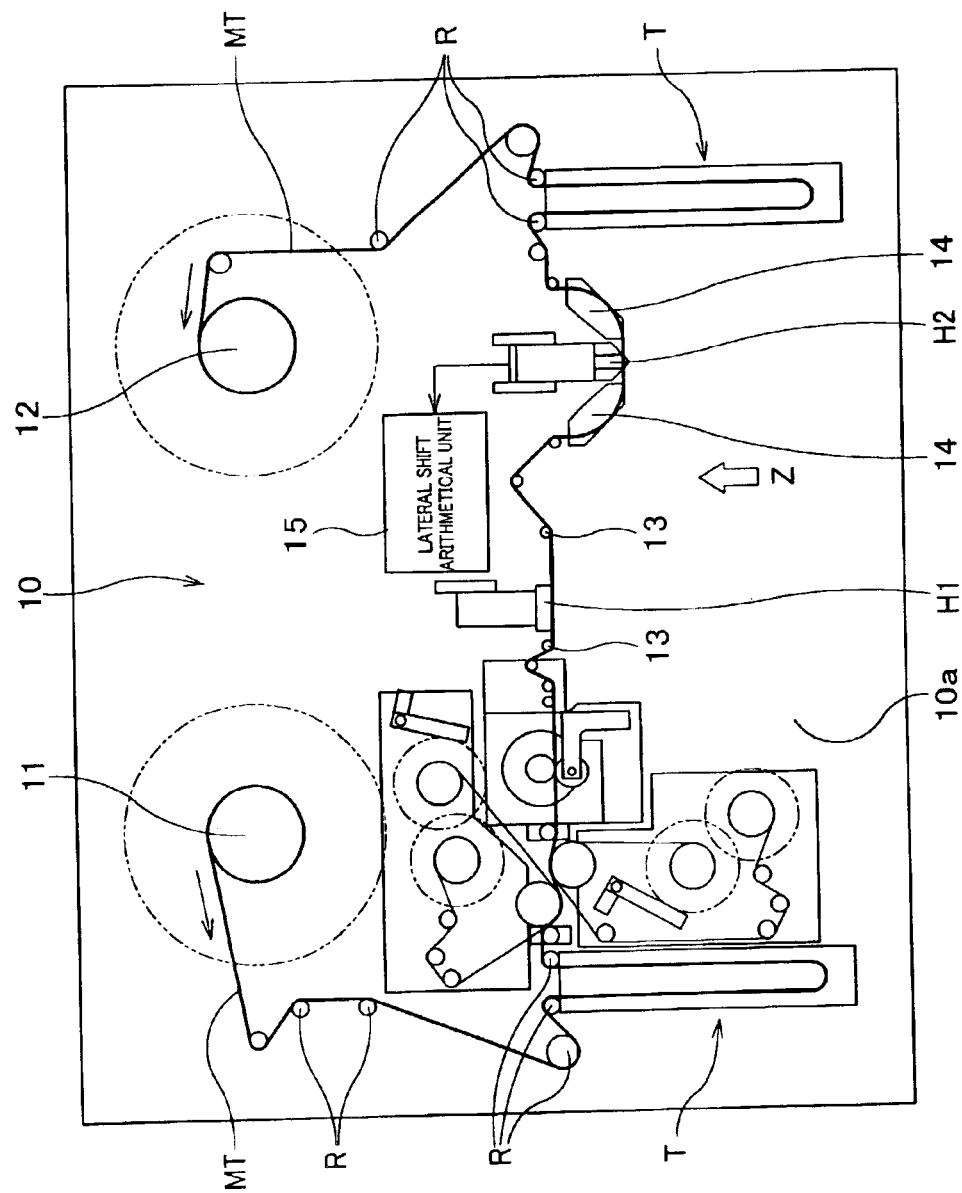
FIG. 1 is a general block diagram of a measurement apparatus according to a first embodiment of the present invention.
Figure 2:
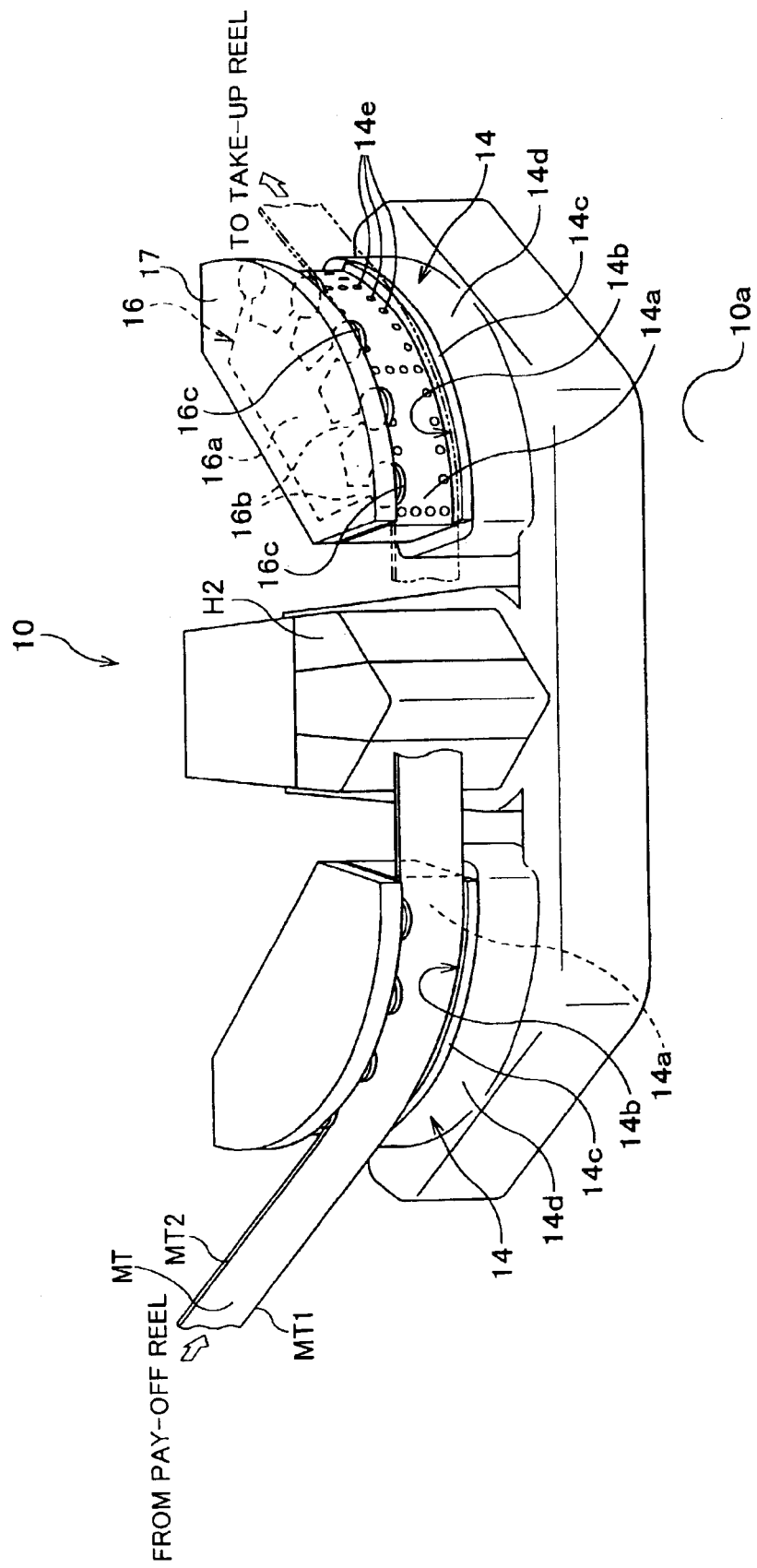
FIG. 2 is an enlarged view in perspective of a tape guide unit as shown in FIG. 1.

Depicted in FIG. 1 is a general block diagram of an apparatus for measuring a lateral shift of magnetic tape (hereinafter referred to as "measurement apparatus") according to a first exemplified embodiment of the present invention. FIG. 2 is an enlarged perspective view of a tape guide unit as shown in FIG. 1.

As shown in FIG. 1, a measurement apparatus 10 includes a pay-off reel 11 for feeding out magnetic tape MT, and a take-up reel 12 for taking up the magnetic tape MT fed out from the pay-off reel 11. In a position downstream of the pay-off reel 1 and upstream of the take-up reel 12 is provided a write head (magnetic write head) H1 that magnetizes part of the magnetic tape MT in a contactless manner to write a signal (information) thereon. Between the write head H1 and the take-up reel 12 is provided a read head (magnetic read head) H2 that detects the signal written by the write head H1. A pair of guides 14, 14 that serves to make the magnetic tape MT run along the read head H2 is provided, one located upstream of the read head H2 and the other downstream thereof. A region in which lateral movement of the magnetic tape MT is restricted by the guides 14, 14 constitutes a tape guide unit according to the present invention. The read head H2 is connected with a lateral shift arithmetical unit 15 that determines a lateral shift amount caused by movement of the magnetic tape MT based upon the signal read by the read head H2. The measurement apparatus 10 is provided with a tension regulator (not shown) for adjusting a tension of the magnetic tape MT to a predetermined tension, a tension detector T, and other equipment of various kinds such as a number of guide rollers R.

The write head H1 is a magnetic head that magnetizes part of running magnetic tape MT in a section where the magnetic tape MT is not restricted from moving laterally. The write head H1 is fixed on a panel side 10a of the measurement apparatus 10. There is provided a pair of guide rollers 13, 13, one located upstream of the write head H1 and the other located downstream thereof, so that the magnetic tape MT runs along a specific guided direction. The guide rollers 13, 13 are not provided with flanges so that the magnetic tape MT is free from restriction on lateral movement. Even in a case where flanges are provided on the guide rollers 13, 13 to restrict lateral movement of the magnetic tape MT to some extent for the purpose of preventing the magnetic tape MT from slipping off its route, the flanges should be spaced sufficiently from the magnetic tape MT. For example, clearance may be determined so that the distance between the paired flanges is sufficiently greater than that between the guides 14, 14; more specifically, the flanges should be spaced apart at a specific distance which is at least 10 $\mu$m greater than a width of the magnetic tape MT.

FIG. 2 is an enlarged perspective view of the tape guide unit according to the first embodiment of the present invention. The guides 14, 14 are mounted on a panel side 10a of the panel side 10a (see FIG. 1) of the measurement apparatus 10.

Contact surfaces 14a, 14a of the guides 14, 14 at which the guides 14, 14 contact the magnetic tape MT are each curved with a cross section thereof shaped like an arc so that a surface of the magnetic tape MT on which a signal is recorded may slide smoothly. In addition, each contact surface 14a of the guides 14, 14 with the surface of the magnetic tape MT is provided with a plurality of holes through which air is jetted to allow the magnetic tape MT to float off, so that the surface of the magnetic tape MT is not brought into contact with the contact surface 14a. At each end of the guides 14, 14 facing the panel side 10a is formed a flange 4d along a direction in which the magnetic tape MT runs. At an end of the flange 14d facing a human side edge (opposite a side edge facing the panel side 10a) is attached a contactor 14c made of plastic, which constitutes an edge guide surface 14b that guides a panel side edge (base edge) MT1 of the magnetic tape MT. The contactor 14c may preferably formed of ceramic material in order to prevent the contactor 14c from wearing out due to sliding friction with the magnetic tape MT.

On a surface at a human side of each guide 14 is attached, for example, an elastic body 16 in order to prevent the magnetic tape MT from suffering damage.

The elastic body is formed of a thin sheet metal (e.g., stainless steel sheet), and a mountable base portion 16a thereof is sandwiched between a top face of each guide 14 and a mount block 17 on which the guide 14 is mounted. A distal end of the elastic body 16 is formed into a plurality of arms 16b, and at a distal end of each arm is mounted a contactor 16c made of plastic or preferably made of ceramic material. Spacing between each contactor 16c of the elastic body 16 and the edge guide surface 14b of the contactor 14c is determined based upon an outmost point of a track of the meandering magnetic tape MT and a maximum width of the widthwise dimensionally varying magnetic tap MT so as to protect the magnetic tape MT from damage caused by a collision of the magnetic tape MT with the arms or the edge guide surface 14b. Allowance may be made for the spacing where appropriate. Specifically, the clearance between the magnetic tape MT and the edge guide surface 14b and between the magnetic tape MT and the contactor 16c is preferably set for example at 0–1 $\mu$m. The elastic body 16 is contacted with the human side edge MT2 of the magnetic tape MT with a very small stress and restricts the movement of the magnetic tape MT. For example, the elasticity coefficient of each arm 16$b$ may preferably be determined so that the contactors 16$c$ may distribute stresses ranging between $0.49 \times 10^{-2}$ N and $7.84 \times 10^{-2}$ N to restrict the movement of the magnetic tape MT.

The read head H2 is a magnetic head for reading a signal written on the magnetic tape MT by the write head H1. The read head H2 is fixed on the panel side 10$a$. Reading elements of the read head H2 are each disposed at a position corresponding to each of writing elements of the write head H1; therefore, if the magnetic tape MT runs stably without lateral movement, the read head H2 can trace substantially every signal written by the write head H1, and can acquire the maximum output available.

The use of the guides 14, 14 as described above allows the fixed read head H2 to read a signal arranged along a line having a predetermined distance spaced from the panel side edge MT1 with a lateral shift in position of the magnetic tape MT being restricted with exquisite precision.

The lateral shift arithmetical unit 15 is a means for carrying out arithmetic/logic operations to determine an extent to which the information is shifted laterally in position as a result of movement of the magnetic tape MT at a position where the write head H1 performs a writing operation. For example, a general purpose computer capable of performing comparison, computation, storage and the like or dedicated circuits may be used as the lateral shift arithmetical unit 15, which for example accumulates output signals read by the read head H2 one by one, and converts a range of the output signals varying for a predetermined period of time into a lateral shift amount of the magnetic tape MT.

Figure 3:
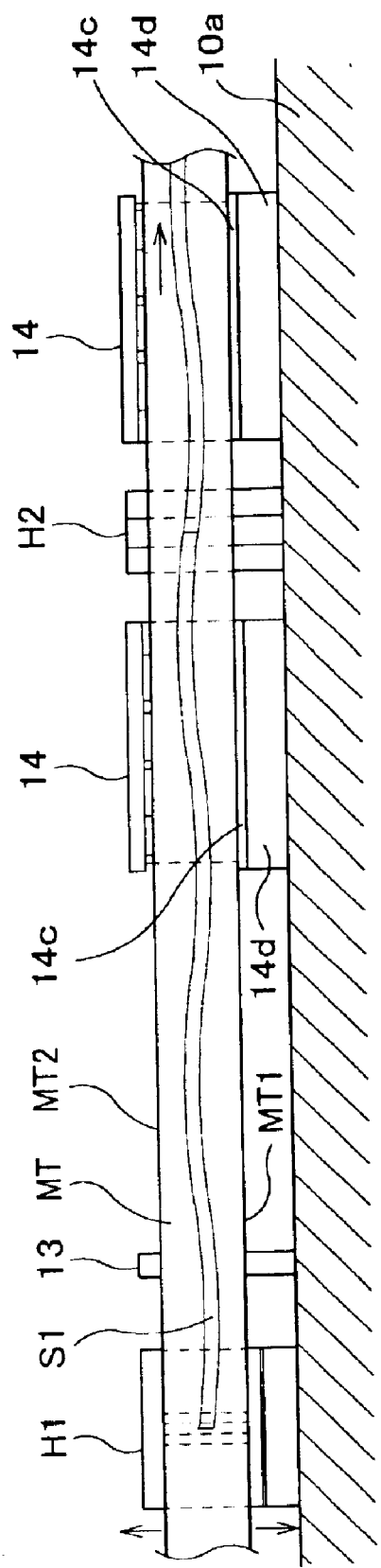
FIG. 3 is a diagram of the measurement apparatus of FIG. 1, as viewed from a direction indicated by an arrow Z.

The measurement apparatus 10 in operation as well as advantageous effects thereof will now be described with reference to FIGS. 1 through 3. FIG. 3 shows the measurement apparatus 10 of FIG. 1 as viewed from a direction indicated by an arrow Z.

As shown in FIG. 1, first, the magnetic tape MT fed out from the pay-off reel 11 is guided by the guide rollers R to travel through the tension detector T to the guide rollers 13, 13. The magnetic tape MT is not restricted from moving laterally by the guide rollers 13, 13, and thus moves in lateral directions to some extent, while signals are written on the magnetic tape MT by the fixed write head H1.

The magnetic tape MT on which signals are written further runs downstream and gets into the tape guide unit. In the tape guide unit, the magnetic tape MT is precisely restricted in lateral positioning by the guides 14, 14, while signals on the magnetic tape MT are read by the fixed read head H2.

Since the write head H1 is fixed, as shown in FIG. 3, signals S1 written by the write head H1 are recorded along a meandering line with respect to the side edges MT1 and MT2 of the magnetic tape MT according to the movement of the magnetic tape MT. On the other hand, since the magnetic tape is precisely restricted from moving laterally by the guides 14, 14 in the tape guide unit, output signals read by the fixed read head H2 vary according to meandering arrangement of the signals S1.

Converting the variations of signals into a lateral shift amount of the magnetic tape MT in the lateral shift arithmetical unit 15 makes it possible to determine the shift amount, i.e., to what extent the magnetic tape MT shifts in lateral directions at a position where the write head H1 is located. Moreover, once the shift amounts are accumulated in the lateral shift arithmetical unit 15 to determine the shift amount for a predetermined period of time in a numerical form, thus-acquired numeric data can be used to evaluate the performance of the magnetic tape MT.

[Second Embodiment]

Figure 4:
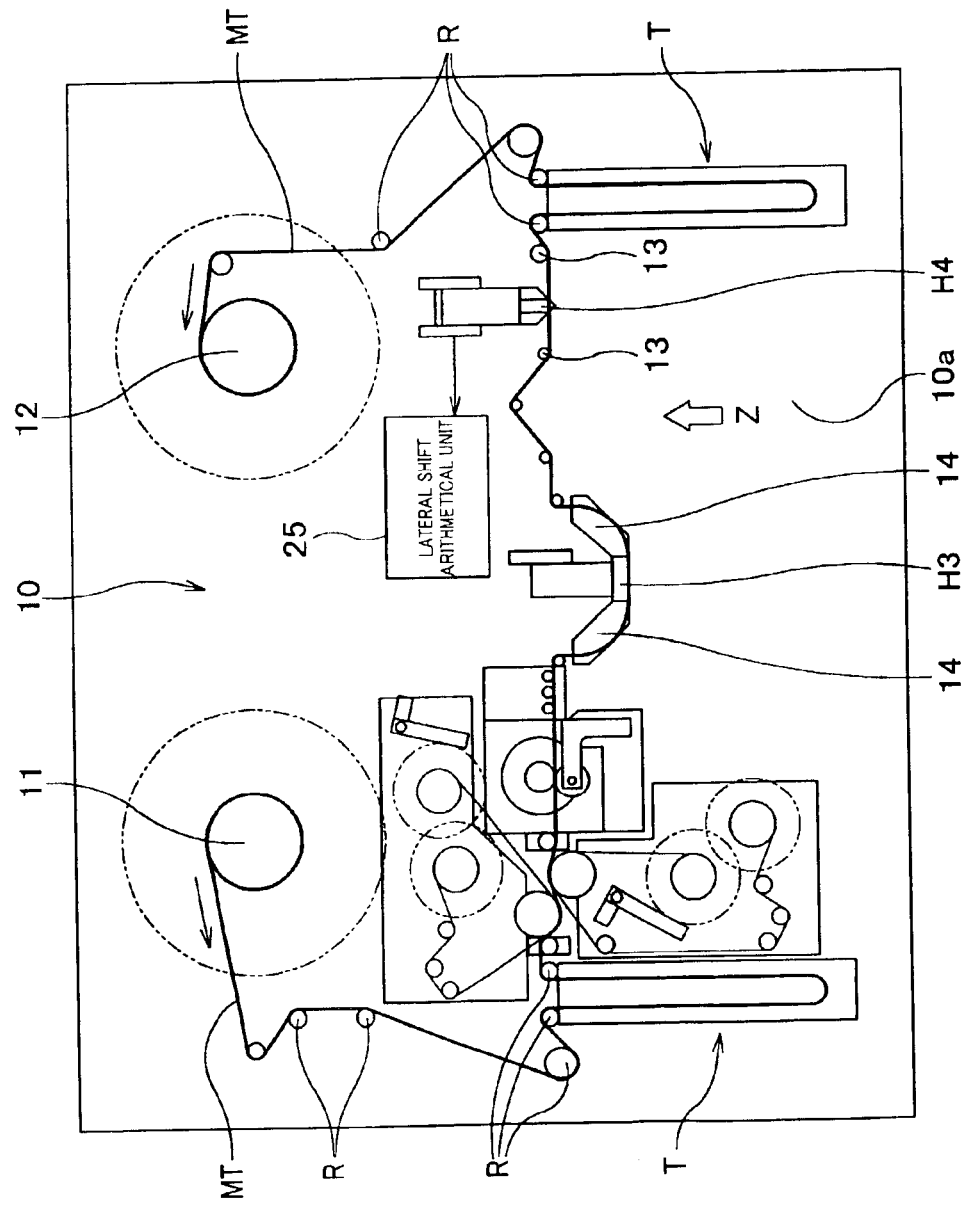
FIG. 4 is a general block diagram of a measurement apparatus according to a second embodiment of the present invention.

Next, a description will be given of a second exemplified embodiment of the present invention. Depicted in FIG. 4 is a general block diagram of a measurement apparatus according to the second embodiment of the present invention. Those elements having the same features as in the first embodiment are designated by the same reference numerals, and a detailed description thereof will be omitted.

As shown in FIG. 4, a measurement apparatus 10 includes a pay-off reel 11 for feeding out magnetic tape MT, and a take-up reel 12 for taking up the magnetic tape MT fed out from the pay-off reel 11. In a position downstream of the pay-off reel 1 and upstream of the take-up reel 12 is provided a write head (magnetic write head) H3 that magnetizes part of the magnetic tape MT to write a signal (information) thereon. A pair of guides 14, 14 that serves to make the magnetic tape MT run along the write head H3 is provided, one located upstream of the read head H2 and the other downstream thereof. A region in which lateral movement of the magnetic tape MT is restricted by the guides 14, 14 constitutes a tape guide unit according to the present invention. Between the guide 14 located in a position downstream of the write head H3 and the take-up reel 12 is provided a read head (magnetic read head) H4 that detects the signal written by the write head H3. The read head H4 is connected with a lateral shift arithmetical unit 25 that determines a lateral shift amount caused by movement of the magnetic tape MT based upon the signal read by the read head H4. The measurement apparatus 10 is provided with a tension regulator (not shown) for adjusting a tension of the magnetic tape MT to a predetermined tension, a tension detector T, and other equipment of various kinds such as a number of guide rollers R.

As details of the guides 14, 14 are the same as in the first embodiment; a duplicate description will be omitted herein.

The write head H3 is a magnetic head that magnetizes part of running magnetic tape MT in a section where the magnetic tape MT is restricted from moving laterally. The write head H3 is fixed on a panel side 10$a$ of the measurement apparatus 10.

The read head H4 is a magnetic head that reads a signal from the running magnetic tape MT in a section where the magnetic tape MT is not restricted from moving laterally. The read head H4 is fixed on the panel side 10$a$ of the measurement apparatus 10. The read head H4 may be provided so that the magnetic tape MT slides over the read head H4; however, if an output of signals readable reaches a sufficient level, it is preferable that the read head H4 reads the signal on the magnetic tape MT in a contactless manner. This is because contactless reading makes it possible to eliminate a detrimental effect of contact between the magnetic tape MT and the read head H4.

There is provided a pair of guide rollers 13, 13, one located upstream of the write head H4 and the other located downstream thereof, so that the magnetic tape MT runs along a specific guided direction. The guide rollers 13, 13 are not provided with flanges so that the magnetic tape MT is free from restriction on lateral movement. Even in a case where flanges are provided on the guide rollers 13, 13 for the purpose of preventing the magnetic tape MT from slipping off its route, the flanges should be spaced sufficiently from the magnetic tape MT. For example, clearance may be determined so that the distance between the paired flanges is sufficiently greater than that between the guides 14, 14; more specifically, the flanges should be spaced apart at a specific distance which is at least 10 μm greater than a width of the magnetic tape MT.

The lateral shift arithmetical unit 25 is a means for carrying out arithmetic/logic operations to determine an extent to which the information is shifted laterally in position as a result of movement of the magnetic tape MT at a position where the read head H4 performs a reading operation. For example, a general-purpose computer capable of performing comparison, computation, storage and the like or dedicated circuits may be used as the lateral shift arithmetical unit 25, which for example accumulates output signals read by the read head H4 one by one, and converts a range of the output signals varying for a predetermined period of time into a lateral shift amount of the magnetic tape MT.

Figure 5:
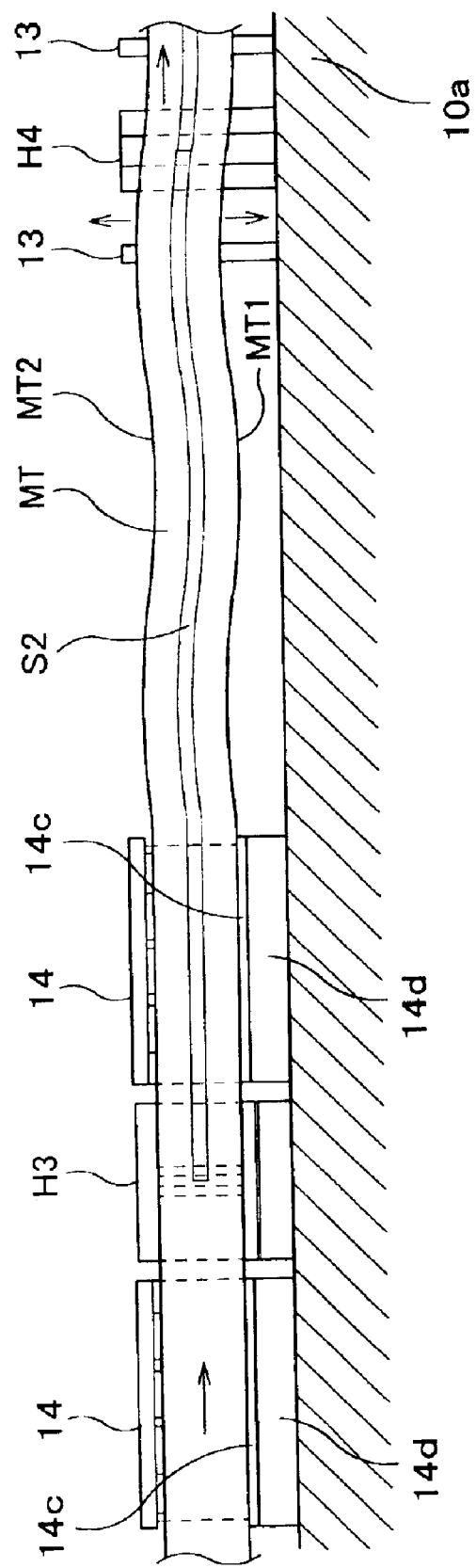
FIG. 5 is a diagram of the measurement apparatus of FIG. 4, as viewed from a direction indicated by an arrow Z.

The above-described measurement apparatus 10 in operation as well as advantageous effects thereof will now be described with reference to FIGS. 4 and 5. FIG. 5 shows the measurement apparatus 10 of FIG. 1 as viewed from a direction indicated by an arrow Z.

As shown in FIG. 4, first, the magnetic tape MT fed out from the pay-off reel 11 is guided by the guide rollers R to travel through the tension detector T to the guide rollers 14, 14 as a tape guide unit. The magnetic tape MT is restricted from moving laterally by the guide rollers 14, 14, while signals S2 are written on the magnetic tape MT by the fixed write head H3 with lateral positioning thereof being precisely restricted. The signals S2 written on the magnetic tape MT are arranged, as shown in FIG. 5, along a line having a predetermined distance from the side edges MT1, MT2 of the magnetic tape MT.

The magnetic tape MT on which the signals S2 are written further runs downstream, and is guided forward by the guide rollers 13, 13. Since the magnetic tape MT is not restricted from moving laterally by the guide rollers 13, 13, the signals S2, as shown in FIG. 5, shift laterally in position according to the lateral movement of the magnetic tape MT. The signals S2 are read by the fixed read head H4.

The output signals read by the read head H4 vary according to the variations of the signals S2. Converting the variations of signals into a lateral shift amount of the magnetic tape MT in the lateral shift arithmetical unit 25 makes it possible to determine the shift amount, i.e., to what extent the magnetic tape MT shifts in lateral directions at a position where the read head H4 is located. Moreover, once the shift amounts are accumulated in the lateral shift arithmetical unit 25 to determine the shift amount for a predetermined period of time in a numerical form, thus-acquired numeric data can be used to evaluate the performance of the magnetic tape MT.

Although the preferred embodiments of the present invention have been described above, the present invention is not limited to the described embodiments, and various modifications and changes may be made in the present invention without departing from the spirit and scope thereof.

As described above, according to the present invention, a lateral shift of the magnetic tape caused by the lateral movement of the magnetic tape which occurs while the magnetic tape is running can be measured.

What is claimed is:

1. An apparatus for measuring a lateral shift of running magnetic tape, comprising:
    a fixed magnetic write head that magnetizes part of the running magnetic tape in a first section of the apparatus where the magnetic tape is free from restriction on lateral movement;
    a tape guide unit that is located in a second section of the apparatus downstream of the fixed magnetic write head to restrict the lateral movement of the magnetic tape; and
    a fixed magnetic read head that reads information on the magnetic tape in the tape guide unit.

2. An apparatus according to claim 1, wherein the fixed magnetic write head magnetizes part of the running magnetic tape in a contactless manner.

3. An apparatus according to claim 1, wherein the tape guide unit restricts the lateral movement of the magnetic tape to an amount less than 1 μm.

4. An apparatus according to claim 1, further comprising a plurality of guide rollers that guide the running magnetic tape, wherein one of the guide rollers located immediately upstream of the fixed magnetic write head and another of the guide rollers located immediately downstream of the fixed magnetic write head are flangeless.

5. An apparatus according to claim 1, further comprising a plurality of guide rollers that guide the running magnetic tape, wherein one of the guide rollers located immediately upstream of the fixed magnetic write head and another of the guide rollers located immediately downstream of the fixed magnetic write head each have a pair of flanges provided at both sides of each guide roller, which are spaced apart at a specific distance which is at least 10 μm greater than a width of the magnetic tape.

6. An apparatus according to claim 1, wherein the tape guide unit includes two guides of which one is located immediately upstream of the fixed magnetic read head and the other is located immediately downstream of the fixed magnetic read head; and
    wherein the guides each include a plurality of contactors that are arranged along lines extending parallel to and outside of each side edge of the magnetic tape for a predetermined distance, thereby restricting the lateral movement of the magnetic tape.

7. An apparatus according to claim 6, wherein the contactors are made of ceramic material.

8. An apparatus according to claim 6, wherein the contactors distribute stresses ranging between $0.49 \times 10^{-2}$ N and $7.84 \times 10^{-2}$ N upon the side edges of the magnetic tape.

9. An apparatus according to claim 6, a contact surface of each guide with a surface of the magnetic tape includes a plurality of holes through which air is jetted.

10. An apparatus for measuring a lateral shift of running magnetic tape, comprising:
    a tape guide unit that restricts lateral movement of the running magnetic tape;
    a fixed magnetic write head that magnetizes part of the magnetic tape in the tape guide unit; and
    a fixed magnetic read head that reads information on the magnetic tape, the fixed magnetic read head being located in a section downstream of the tape guide unit, where the magnetic tape is free from restriction on lateral movement.

11. An apparatus according to claim 10, wherein the fixed magnetic read head reads information on the magnetic tape in a contactless manner.

12. An apparatus according to claim 10, wherein the tape guide unit restricts the lateral movement of the magnetic tape to an amount less than 1 μm.

13. An apparatus according to claim 10, further comprising a plurality of guide rollers that guide the running magnetic tape, wherein one of the guide rollers located immediately upstream of the fixed magnetic read head and another of the guide rollers located immediately downstream of the fixed magnetic read head are flangeless.

14. An apparatus according to claim 10, further comprising a plurality of guide rollers that guide the running magnetic tape, wherein one of the guide rollers located immediately upstream of the fixed magnetic read head and another of the guide rollers located immediately downstream of the fixed magnetic read head each have a pair of flanges provided at both sides of each guide roller, which are spaced apart at a specific distance which is at least 10 μm greater than a width of the magnetic tape.

15. An apparatus according to claim 10, wherein the tape guide unit includes two guides of which one is located immediately upstream of the fixed magnetic write head and the other is located immediately downstream of the fixed magnetic write head; and wherein the guides each include a plurality of contactors that are arranged along lines extending parallel to and outside of each side edge of the magnetic tape for a predetermined distance, thereby restricting the lateral movement of the magnetic tape.

16. An apparatus according to claim 10, wherein the contactors are made of ceramic material.

17. An apparatus according to claim 10, wherein the contactors distribute stresses ranging between $0.49 \times 10^{-2}$ N and $7.84 \times 10^{-2}$ N upon the side edges of the magnetic tape.

18. An apparatus according to claim 10, a contact surface of each guide with a surface of the magnetic tape includes a plurality of holes through which air is jetted.

19. An apparatus for measuring a lateral shift of running magnetic tape, comprising:

a fixed magnetic write head that magnetizes part of the running magnetic tape in a contactless manner in a first section of the apparatus where the magnetic tape is free from restriction on lateral movement;

a fixed magnetic read head that is located in a second section of the apparatus downstream of the fixed magnetic write head to read information on the magnetic tape;

two guides of which one is located immediately upstream of the fixed magnetic read head and the other is located immediately downstream of the fixed magnetic read head; and a lateral shift arithmetical unit that determines a lateral shift amount caused by movement of the magnetic tape based upon information read by the fixed magnetic read head, wherein the guides each include a plurality of ceramic contactors that are arranged along lines extending parallel to and outside of each side edge of the magnetic tape for a predetermined distance, thereby restricting the lateral movement of the magnetic tape, an elastic body that distributes stresses ranging between $0.49 \times 10^{-2}$ N and $7.84 \times 10^{-2}$ N upon the side edges of the magnetic tape, and a plurality of holes that are provided in a contact surface of each guide with a surface of the magnetic tape, to jet air therethrough, and whereby the lateral movement of the magnetic tape is restricted to an amount less than 1 μm.

* * * * *